United States Patent
Toyoda

(10) Patent No.: US 11,829,660 B2
(45) Date of Patent: Nov. 28, 2023

(54) PRINT CONTROL METHOD AND IMAGE FORMING APPARATUS DETERMINES SKIP PERMISSION CONDITIONS TO EXECUTE PRINT PROCESSING FOR CONFIDENTIAL JOB DATA

(71) Applicant: KYOCERA Document Solutions Inc., Osaka (JP)

(72) Inventor: Takashi Toyoda, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/693,511

(22) Filed: Mar. 14, 2022

(65) Prior Publication Data
US 2022/0300222 A1 Sep. 22, 2022

(30) Foreign Application Priority Data
Mar. 17, 2021 (JP) .................................. 2021-044029

(51) Int. Cl.
G06F 3/12 (2006.01)
G06F 21/60 (2013.01)
H04N 1/00 (2006.01)

(52) U.S. Cl.
CPC .......... *G06F 3/1222* (2013.01); *G06F 3/1238* (2013.01); *G06F 21/608* (2013.01); *H04N 1/0092* (2013.01); *H04N 1/00923* (2013.01)

(58) Field of Classification Search
None
See application file for complete search history.

(56) References Cited

U.S. PATENT DOCUMENTS

| | | | |
|---|---|---|---|
| 10,055,555 B2* | 8/2018 | Hosoda | G06F 21/608 |
| 2005/0276641 A1* | 12/2005 | Morita | G03G 15/5087 399/382 |
| 2009/0051963 A1* | 2/2009 | Igarashi | H04N 1/00344 358/1.15 |
| 2013/0070271 A1* | 3/2013 | Torii | G06K 15/1809 358/1.13 |
| 2015/0339561 A1* | 11/2015 | Takenaka | G06F 3/1238 358/1.14 |

FOREIGN PATENT DOCUMENTS

JP 2006-142503 6/2006

* cited by examiner

*Primary Examiner* — Haris Sabah
(74) *Attorney, Agent, or Firm* — LEX IP MEISTER, PLLC

(57) ABSTRACT

A print control method includes a confidential print control step. The confidential print control step includes determining whether skip permission conditions set in advance for each of the plurality of pieces of user designation data are satisfied when the submission destination designation data of the confidential job data requested to be executed includes a plurality of pieces of user designation data assigned with prioritization orders, thereby specifying the user designation data falling within a print permission range according to the prioritization orders, and executing confidential print control for the user designation data within the print permission range. The confidential print control step includes causing to execute the print processing for the confidential job data on the condition that the input authentication data by which the user authentication process is successful matches the data corresponding to the user designation data among the plurality of pieces of registration authentication data.

6 Claims, 6 Drawing Sheets

PRINT CONTROL METHOD AND IMAGE FORMING APPARATUS DETERMINES SKIP PERMISSION CONDITIONS TO EXECUTE PRINT PROCESSING FOR CONFIDENTIAL JOB DATA

INCORPORATION BY REFERENCE

This application is based upon and claims the benefit of prioritization from the corresponding Japanese Patent Application No. 2021-44029 filed on Mar. 17, 2021, the entire contents of which are incorporated herein by reference.

BACKGROUND

The present disclosure relates to a print control method and an image forming apparatus.

In an image forming apparatus, there is a case where a control unit performs confidential print control. The control unit stores the received confidential job data in a storage device in the confidential print control. Further, when the authentication process for the user designated in the confidential job data is successful, the control unit causes the printing device to execute the print processing for the confidential job data.

For example, it is known that one of a plurality of authentication methods is designated in the confidential job data, and the image processing apparatus determines whether or not the print processing based on the confidential job data is permitted by the designated authentication method.

SUMMARY

A print control method according to one aspect of the present disclosure wherein an image forming apparatus stores, when the image forming apparatus receives confidential job data including the print data and the submission destination designation data for designating the submission destination, the confidential job data in a storage device, and after that, the image forming apparatus executes print processing based on the print data of the confidential job data when user authentication corresponding to the submission destination designation data is successful, includes an authentication processing step and a confidential print control step.

The authentication processing step includes a step of collating input authentication data with a plurality of pieces of registration authentication data in registration user data registered in advance.

The confidential print control step includes a step of determining whether skip permission conditions set in advance for each of the plurality of pieces of user designation data are satisfied when the submission destination designation data of the confidential job data requested to be executed includes a plurality of pieces of user designation data assigned with prioritization orders, thereby specifying the user designation data falling within a print permission range according to the prioritization orders, and executing confidential print control for the user designation data within the print permission range.

The confidential print control step includes a step of causing the image forming apparatus to execute the print processing for the confidential job data on the condition that the input authentication data by which the user authentication process is successful matches the data corresponding to the user designation data among the plurality of pieces of registration authentication data.

The confidential print control step includes a step of causing the image forming apparatus to execute the print processing for the confidential job data on the condition that the input authentication data by which the user authentication processing is successful matches data corresponding to the user designation data among the plurality of pieces of registration authentication data.

A print control method according to another aspect of the present disclosure includes a setting step and a transmission step.

The setting step includes a step of setting a plurality of pieces of user designation data prioritized according to an operation to an information input device.

The transmission step includes a step of transmitting confidential job data including print data and the plurality of pieces of prioritized user designation data to an image forming apparatus through a communication device.

An image forming apparatus according to one aspect of the present disclosure includes a communication device, a printing device, a storage device, a user authentication processing device, and a confidential print control unit.

The communication device can receive job data including print data.

The printing device can execute print processing based on the print data.

The storage device can store the print data.

The user authentication processing device can execute user authentication processing.

When the communication device receives the confidential job data including the print data and the submission destination designation data for designating the submission destination, the confidential print control unit stores the confidential job data in the storage device, and after that, when the user authentication corresponding to the submission destination designation data is successful, makes the printing device execute print processing based on the print data of the confidential job data.

The user authentication processing device executes user authentication processing for collating input authentication data, having been input, with a plurality of pieces of registration authentication data in registration user data registered in advance.

When the submission destination designation data of the confidential job data requested to be executed includes a plurality of pieces of user designation data assigned with prioritization orders, the confidential print control unit determines whether skip permission conditions set in advance for each of the plurality of pieces of user designation data are satisfied, thereby specifying the user designation data falling within a print permission range according to the prioritization orders, and makes the printing device execute confidential print control for the user designation data within the print permission range.

The confidential print control unit causes the printing device to execute the print processing for the confidential job data on condition that the input authentication data by which the user authentication process is successful matches the data corresponding to the user designation data among the plurality of pieces of registration authentication data.

DETAILED DESCRIPTION

Embodiments of the present disclosure will be described below with reference to the drawings. Note that the following embodiment is an embodiment of the present disclosure and does not limit the technical scope of the present disclosure.

Figure 1:
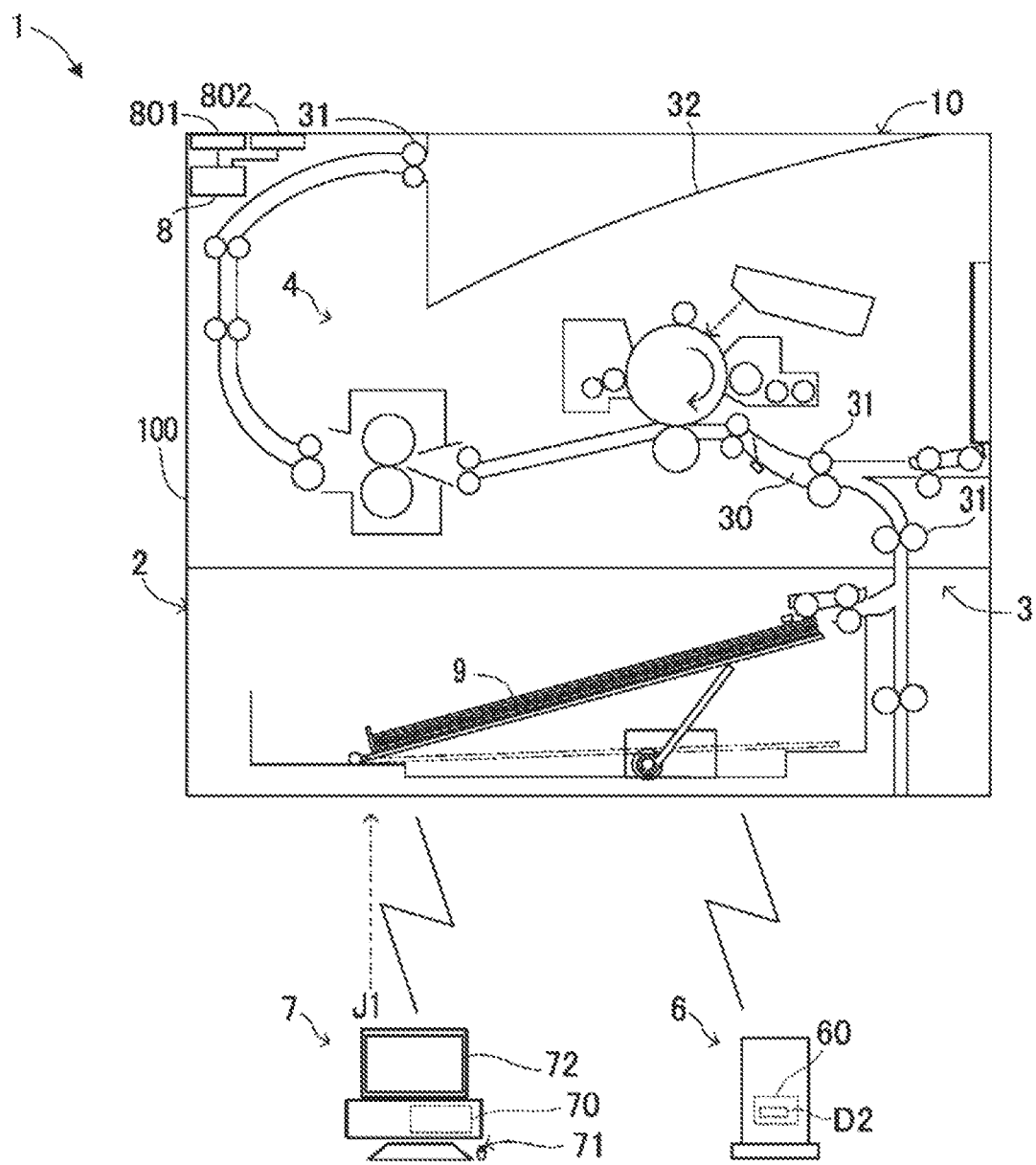
FIG. 1 is a diagram showing a configuration of an image forming system including an image forming apparatus according to an embodiment.

As shown in FIG. 1, the image forming apparatus 10 according to the embodiment constitutes the image forming system 1 together with the host device 7.

[Configuration of Image Forming Apparatus 10]

The image forming apparatus 10 forms an image on the sheet 9. The host device 7 is an information processing apparatus such as a personal computer. The image forming apparatus 10 and the host device 7 can communicate with each other (see FIG. 1).

The image forming apparatus 10 includes a sheet feeding device 2, a sheet conveying device 3, a printing device 4, a control unit 8, an input device 801, and a display device 802 (see FIG. 1).

A sheet feeding device 2 feeds a plurality of sheets 9 one by one to a conveyance path 30. The sheet conveying device 3 includes a plurality of pairs of conveyance rollers 31 and a discharge tray 32. The plurality of pairs of conveyance rollers 31 convey the sheet 9 along the conveyance path 30, and discharge the sheet 9 on which the image is formed from the conveyance path 30 onto the discharge tray 32.

The printing device 4 executes print processing for forming an image on the sheet 9 conveyed along the conveyance path 30. In the example shown in FIG. 1, the printing device 4 executes the print processing in an electrophotographic manner. The printing device 4 may be an device for executing the print processing by another method such as an inkjet method.

The input device 801 is an information input device for receiving an input operation of information. For example, the input device 801 includes one or both of an operation button and a touch panel. The input device 801 may be a device for receiving the input operation different from the operation by a human hand, such as voice input operation.

The display device 802 can display various types of information such as characters and images. For example, a panel display device is employed as the display device 802.

The control unit 8 executes various types of data processing and control of the image forming apparatus 10.

Figure 2:
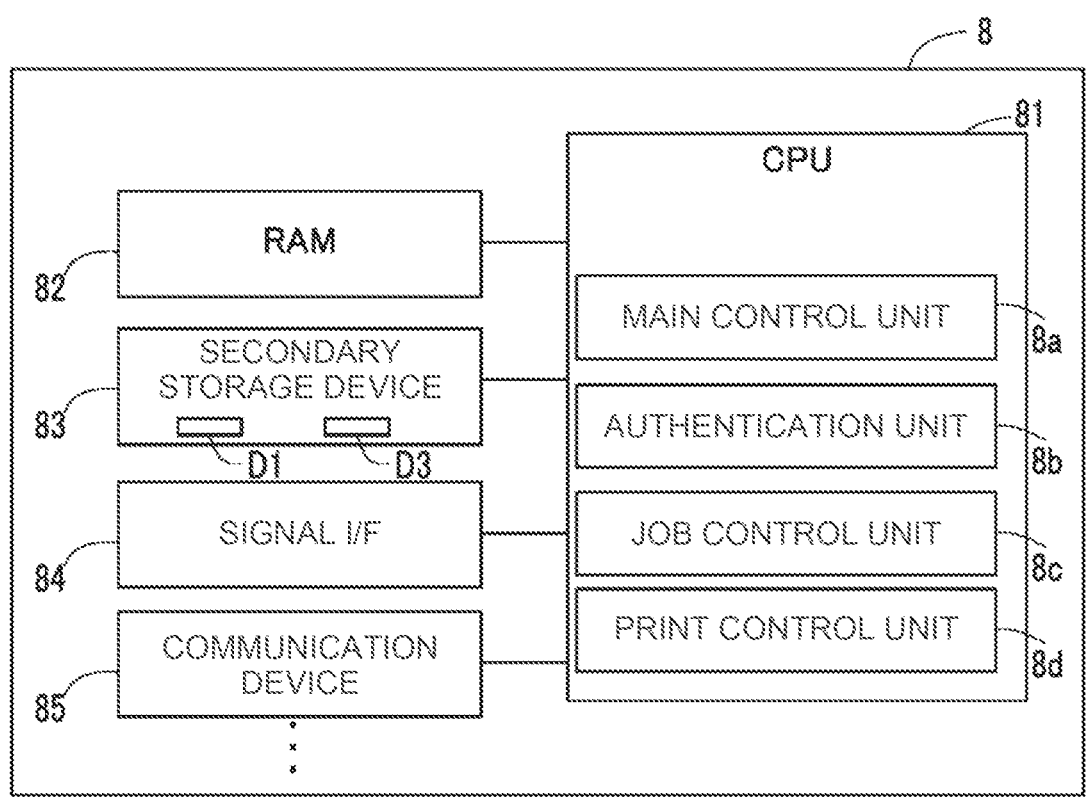
FIG. 2 is a block diagram showing the configuration of a control device in the image forming apparatus according to the embodiment.

As shown in FIG. 2, the control unit 8 includes a Central Processing Unit (CPU) 81 and peripheral devices such a Random Access Memory (RAM) 82, a secondary storage device 83, and a signal interface 84. The control unit 8 also includes a communication device 85 that can communicate with other devices such as the host device 7 and the data server 6.

The secondary storage device 83 is a computer-readable nonvolatile storage device. The secondary storage device 83 can store and update the computer program and various types of data. For example, one or both of a flash memory and a hard disk drive are employed as the secondary storage device 83.

In this embodiment, the registration user data D1 is previously stored in the secondary storage device 83. The registration user data D1 includes information about the user of the image forming apparatus 10.

Figure 4:
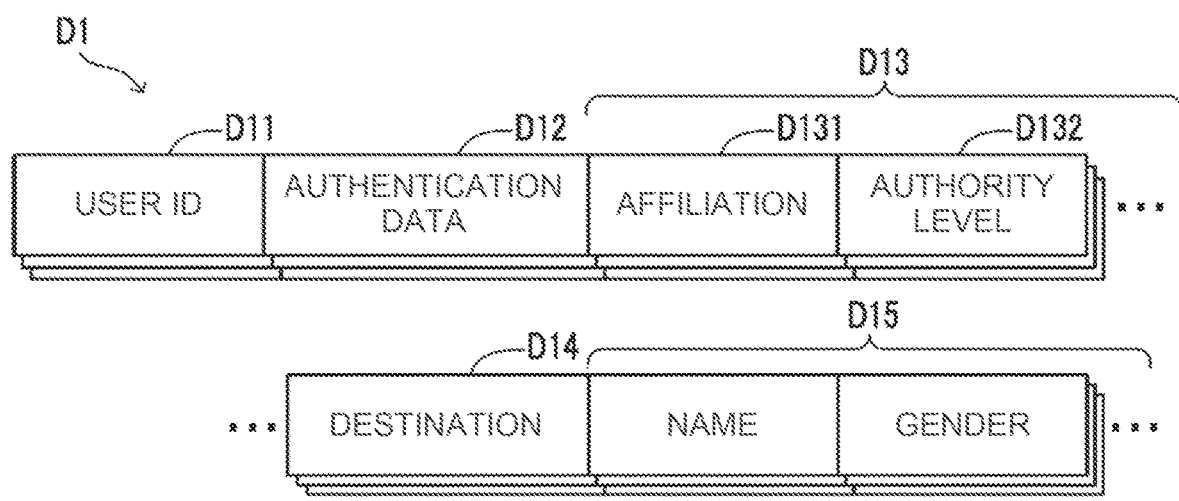
FIG. 4 is a diagram showing an example of the configuration of the registration user data.

For example, as shown in FIG. 4, the registration user data D1 includes a user ID (D11) corresponding to each of a plurality of users, authentication data D12, organization attribute data D13, destination D14, and private attribute data D15.

The user ID (D11) is public identification information unique to each user. The authentication data D12 is secret information used for user authentication processing, such as a password. In this embodiment, the user ID (D11) and the authentication data D12 for each user in the registration user data D1 are registration authentication data.

The organization attribute data D13 represents a user attribute relating to an organization utilizing the image forming apparatus 10. In this embodiment, the organization attribute data D13 includes data of the user's affiliation D131 and authority level D132.

The affiliation D131 is affiliation information of each user such as a department or a project to which each user belongs. An authority level D132 represents an authority level of each user. For example, authority level D132 corresponds to a job title for each user.

The destination D14 is information of a communication address such as an electronic mail address of each user. The private attribute data D15 is data of user attributes other than the organization attribute data D13, such as name and gender.

The signal interface 84 converts signals output from various sensors into digital data and transmits the converted digital data to the CPU 81. Further, the signal interface 84 converts the control command output by the CPU 81 into a control signal, and transmits the control signal to the device to be controlled.

The communication device 85 executes communication with other devices such as the host device 7 and the data server 6 through a communication network such as a Local Area Network (LAN) and the Internet. The communication device 85 can receive various types of data such as job data including print data from the host device 7. The CPU 81 communicates with the other device through the communication device 85.

The CPU 81 is a processor that executes various types of data processing and control by executing a computer program. The RAM 82 is a computer-readable volatile storage device. The RAM 82 primarily stores the computer program executed by the CPU 81 and data to be output and referenced in the process of the CPU 81 executing various processes.

The CPU 81 of the image forming apparatus 10 includes a plurality of processing modules realized by executing the computer program. The plurality of processing modules include a main control unit 8a, an authentication unit 8b, a job control unit 8c, and a print control unit 8d, etc.

The main control unit 8a executes control for starting various types of processing in response to an input operation to the input device 801, control of the display device 802, and the like.

An authentication unit 8b executes user authentication processing. In the user authentication processing, an authentication unit 8b a collates input authentication data inputted by an input operation to an input device 801 with the registration authentication data for each user.

In this embodiment, the input authentication data is a combination of an input ID corresponding to the user ID (D11) and an input code corresponding to the authentication data D12.

When the input authentication data corresponds to any one of the registration authentication data in the registration user data D1, the authentication unit 8b determines that the user authentication processing is successful, and otherwise determines that the user authentication processing failed.

A job control unit 8c receives job data from a host device 7 through a communication device 85. Further, the job control unit 8c executes necessary processing for the job data or makes another processing module execute necessary processing for the job data according to the contents of the job data.

A print control unit 8d controls a sheet feeding device 2, a sheet conveying device 3 and a printing device 4. Thus, the print control unit 8d causes the printing device 4 to execute the print processing based on the print data included in the job data.

[Configuration of Host Device 7]

As shown in FIG. 1, the host device 7 includes a data processing device 70, an input device 71, and a display device 72. The input device 71 is an information input device such as a keyboard or a touch panel. The display device 72 can display information such as characters and images. It should be noted that the input device 71 may be a device for receiving the input operation different from an operation by a human hand, such as a voice input operation, just as the input device 801.

Figure 3:
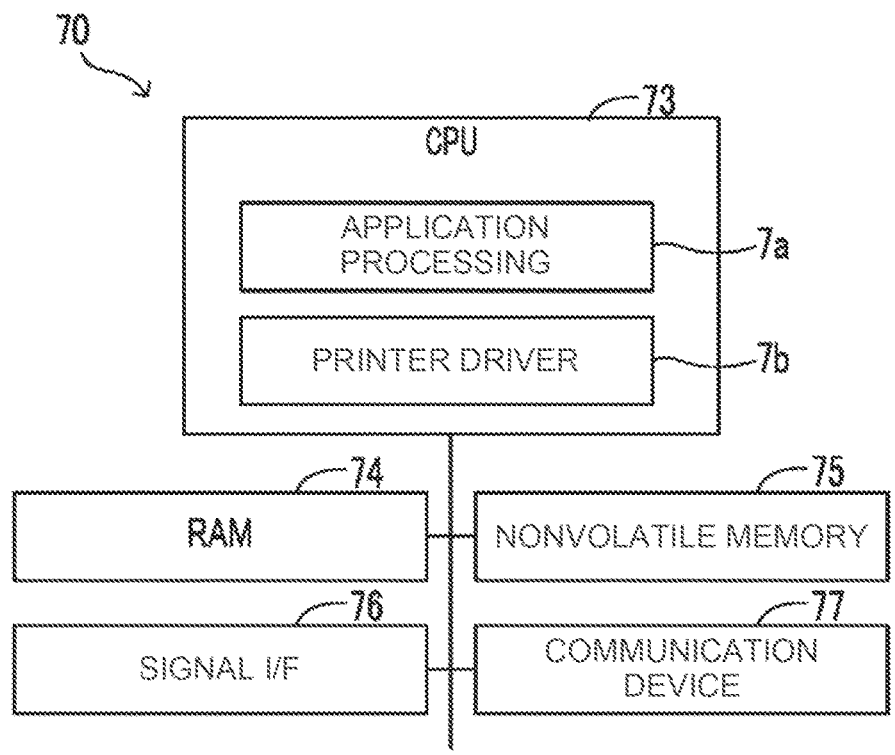
FIG. 3 is a block diagram showing the configuration of a data processing apparatus in the host device.

As shown in FIG. 3, the data processing device 70 includes a CPU 73, a RAM 74, a nonvolatile memory 75, a signal interface 76, and a communication device 77, etc.

The functions of the CPU 73, the RAM 74, the nonvolatile memory 75, the signal interface 76, and the communication device 77 are the same as those of the CPU 81, the RAM 82, the secondary storage device 83, the signal interface 84, and the communication device 85 in the control unit 8 of the image forming apparatus 10, respectively.

The CPU 73 of the host device 7 is a processor capable of executing various kinds of data processing. The CPU 73 includes a plurality of processing modules implemented by executing a computer program. The plurality of processing modules include an application processing unit 7a and a printer driver 7b, etc.

The application processing unit 7a executes processing for generating, for example, document data, drawing data, or the like, which is the source of the print data. The printer driver 7b generates the job data and executes processing for transmitting the job data to the image forming apparatus 10 through the communication device 77.

The printer driver 7b may generate the confidential job data J1 as the job data. The confidential job data J1 includes print data J10 and submission destination designation data J2 for designating a submission destination of a document corresponding to the print data J10 (see FIGS. 6 and 7).

A job control unit 8c of the image forming apparatus 10 executes the confidential job control when the confidential job data J1 is received. The confidential job control includes job storage processing and confidential print control.

In the job storage processing, the job control unit 8c stores the received confidential job data J1 in the secondary storage device 83. Further, the job control unit 8c executes the confidential print control when the print processing of the confidential job data J1 stored in the secondary storage device 83 is requested.

In the confidential print control, the job control unit 8c makes the printing device 4 execute the print processing based on the print data of the confidential job data J1 on the condition that the user authentication processing for the user designated in the confidential job data J1 succeeds.

Figure 6:
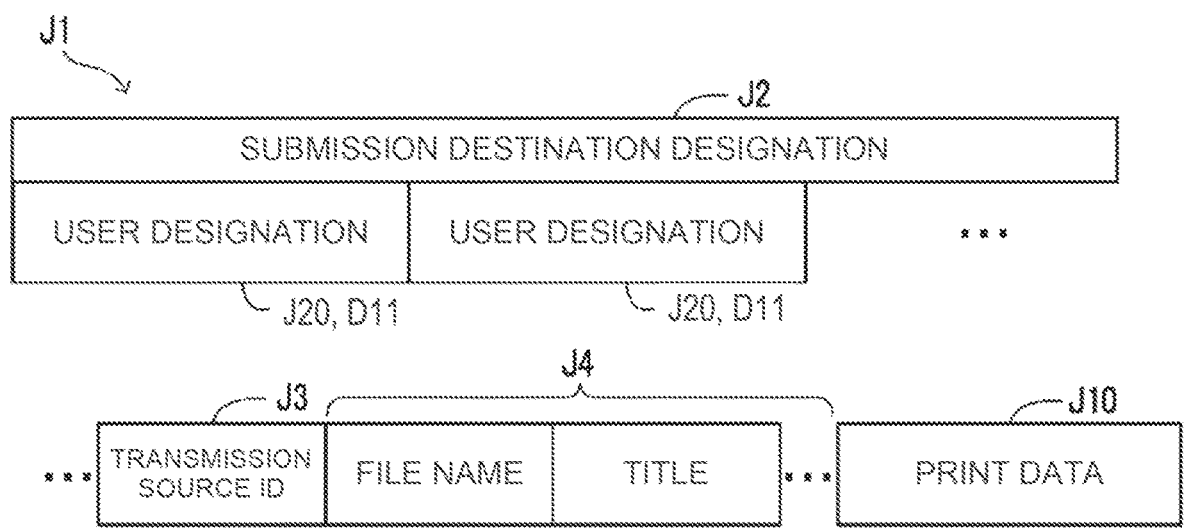
FIG. 6 is a diagram showing an example of the configuration of the confidential job data of the user designation type.
Figure 7:
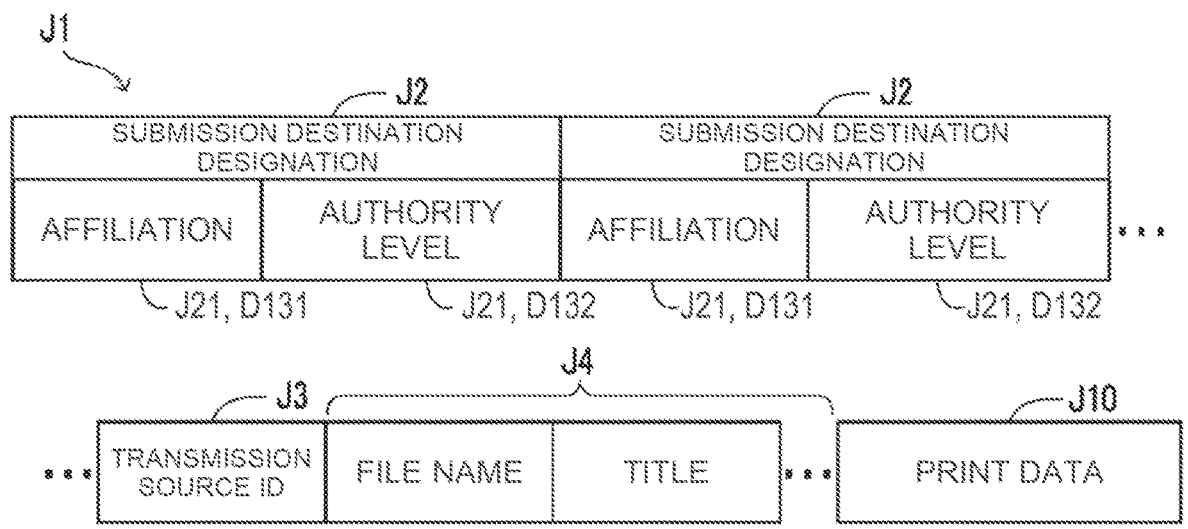
FIG. 7 is a diagram showing an example of the configuration of the confidential job data of the attribute designation type.

In this embodiment, the confidential job data J1 includes submission destination designation data J2 for designating a submission destination (see FIGS. 6 and 7). When the user authentication corresponding to the submission destination designation data J2 is successful, the job control unit 8c causes the printing device 4 to execute the print processing based on the print data J10 of the confidential job data J1 (see steps S204 to S208 in FIG. 8 to be described later).

For example, when the confidential job data J1 is data of a document requiring approval, such as data of an application form, a user who is a recipient of the document is designated as a user who is permitted to perform the print processing in the confidential job data J1.

However, if the user designated in the confidential job data J1 cannot perform the work for printing and confirming the document quickly, the necessary procedures may be delayed.

Depending on the type of document corresponding to the confidential job data J1, it may be desirable to designate a document submission destination including a plurality of users in the confidential job data J1. However, in this case, it is important to control the prioritization order of the users to process the document of the confidential job data J1 in order to avoid confusion in document processing.

In the image forming system 1, the printer driver 7b of the host device 7 executes a confidential job transmission processing to be described later (see FIG. 5). Further, the job control unit 8c of the image forming apparatus 10 executes the confidential print control described later (see FIG. 8).

The confidential job transmission processing and the confidential print control enable output control based on the prioritization order of the user with respect to the confidential job data J1 for which a document submission destination including a plurality of users is designated.

Transmit Confidential Job Processing

An example of the procedure of the confidential job transmission processing will be described below with reference to the flowchart shown in FIG. 5. The confidential job transmission processing is an example of processing for realizing a print control method by the CPU 73 of the host device 7.

The printer driver 7b starts the confidential job transmission processing when an operation requesting the input device 71 to transmit the confidential job data J1 is performed.

In the following description, S101, S102 and ... represent identification codes of a plurality of processes in the confidential job transmission processing. In the confidential job transmission processing, first, the process of step S101 is started.

Step S101

In step S101, the printer driver 7b selects the target data from the data stored in the nonvolatile memory 75 according to the selection operation to the input device 71. The target data is document data to be printed based on the confidential job data J1.

After selecting the target data, the printer driver 7b shifts the process to step S102.

Step S102

In step S102, the printer driver 7b selects the submission designation method of the destination of the document based on the target data according to the selection operation to the input device 71. In the present embodiment, the designation method is user designation or attribute designation.

The printer driver 7b shifts the process to step S103 when the user designation is selected, and shifts the process to step S106 when the attribute designation method is selected.

Step S103

In step S103, the printer driver 7b acquires the registration user data D1 stored in the secondary storage device 83 from the image forming apparatus 10. Thereafter, the printer driver 7b shifts the process to step S104.

Step S104

In step S104, the printer driver 7b outputs a predetermined user designation screen to the display device 72 based on the registration user data D1. Thereafter, the printer driver 7b shifts the process to step S105.

The user designation screen is a screen for displaying user IDs (D11) of a plurality of users in the registration user data D1 as designation candidates. The user designation screen is also a screen for displaying organization attribute data D13 and private attribute data D15 corresponding to a plurality of users in association with user IDs (D11) of the plurality of users.

Step S105

In step S105, the printer driver 7b sets one or more user IDs (D11) as the submission destination of the document based on the target data in accordance with an operation to the input device 71. Thereafter, the printer driver 7b shifts the process to step S109.

Specifically, in step S105, the printer driver 7b sets one or more pieces of user designation data J20 to be included in the submission destination designation data J2 representing the submission destination. The user designation data J20 in this embodiment is a user ID (D11). That is, the user ID (D11) constitutes one piece of user designation data J20.

When setting submission destination designation data J2 including a plurality of pieces of user designation data J20, the printer driver 7b sets a plurality of pieces of user designation data J20 with prioritization order.

Step S106

On the other hand, in step S106, the printer driver 7b acquires the registration user data D1 from the image forming apparatus 10 in the same manner as in step S103. Thereafter, the printer driver 7b shifts the process to step S107.

Step S107

In step S107, the printer driver 7b outputs a predetermined attribute designation screen to the display device 72 based on the registration user data D1. Thereafter, the printer driver 7b shifts the process to step S108.

The attribute designation screen is a screen for displaying the user attribute included in the organization attribute data D13 in the registration user data D1 as a designation candidate. The attribute designation screen is also a screen for displaying the user ID (D11) and the private attribute data D15 in the registration user data D1 in association with the user attribute of the organization attribute data D13.

Step S108

In step S108, the printer driver 7b sets one or more user attributes in the organization attribute data D13 as the submission destination according to an operation to the input device 71.

As described above, the user attribute in the organization attribute data D 13 includes at least information of the user's affiliation D131 (see FIG. 4).

Specifically, the printer driver 7b sets one or more pieces of submission destination designation data J2 including one or more pieces of attribute designation data J21 in accordance with an operation to the input device 71 (see FIG. 7). The attribute designation data J21 is data of the user attribute such as the user's affiliation D131 or the authority level D132.

FIG. 7 shows an example in which a plurality of pieces of submission destination designation data J2 including two pieces of attribute designation data J21 for designating the affiliation D131 and the authority level D132, respectively, are set. It is also conceivable that one or more pieces of submission destination designation data J2 including only one piece of attribute designation data J21 is set.

When a plurality of pieces of submission destination designation data J2 are set as the submission destination, a printer driver 7b sets a plurality of pieces of submission destination designation data J2 with prioritization orders. That is, the printer driver 7b can set the user attribute for each of the plurality of prioritized submission destination designation data J2.

After setting one or more pieces of submission destination designation data J2 including one or more pieces of attribute designation data J21, the printer driver 7b shifts the process to step S109.

Step S109

In step S109, the printer driver 7b generates confidential job data J1 including print data J10 and one or more pieces of submission destination designation data J2 set in step S105 or step S108 (see FIGS. 6 and 7).

In step S109, the printer driver 7b generates print data J10 based on the target data selected in step S101, and includes the print data J10 in the confidential job data J1 (see FIGS. 6 and 7).

When the user designation is selected as the designation method, the printer driver 7b includes the submission destination designation data J2 including one or more pieces of user designation data J20 in the confidential job data J1. In this case, the user designation data J20 is data directly designating the user as the submission destination.

When a plurality of pieces of prioritized user designation data J20 are set in the step S105, the printer driver 7b includes the plurality of the prioritized user designation data J20 in the submission destination designation data J2.

In the example shown in FIG. 6, the order of the plurality of pieces of user designation data J20 in the submission destination designation data J2 represents the prioritization order. The prioritized data associated with the plurality of pieces of user designation data J20 may be included in the confidential job data J1.

On the other hand, when the attribute designation is selected as the designation method, the printer driver 7b includes one or more pieces of submission destination designation data J2 including one or more pieces of attribute designation data J21 in the confidential job data J1 (see FIG. 7). In this case, the attribute designation data J21 is data for designating the user attribute as the submission destination.

When a plurality of the pieces of prioritized submission destination designation data J2 are set in the step S108, the printer driver 7b includes the pieces of prioritized submission destination designation data J2 in the submission destination designation data J2.

In the example shown in FIG. 7, the order of the plurality of pieces of submission destination designation data J2 in the confidential job data J1 represents the prioritization order. Note that the prioritized data associated with the plurality of pieces of submission destination designation data J2 may be included in the confidential job data J1.

That is, when the user designation is selected as the designation method, the confidential job data J1 includes the print data J10 and one or more pieces of user designation data J20 (see FIG. 6).

When a plurality of pieces of user designation data J20 are set in the step S105, the confidential job data J1 includes the print data J10 and a plurality of pieces of user designation data J20 which are prioritized (see FIG. 6).

On the other hand, when the attribute designation is selected as the designation method, the confidential job data J1 includes print data J10 and one or more pieces of attribute designation data J21 for designating the set user attribute (see FIG. 7).

When one piece of submission destination designation data J2 is set in the step S108, the confidential job data J1 includes the print data J10 and a plurality of pieces of submission destination designation data J2 which are prioritized. Each piece of the submission destination designation data J2 includes one or more pieces of attribute designation data J21 (see FIG. 7).

Further, the printer driver 7b also includes the transmission source ID (J3) and the document-related data J4 about the target data, etc., in the confidential job data J1 (see FIGS. 6 and 7). The transmission source ID is a user ID (D11) corresponding to the transmission source user of the confidential job data J1. The document-related data J4 is data representing the file name and title of the target data and the like.

After generating the confidential job data J1, the printer driver 7b shifts the process to step S110.

Step S110

In step S110, the printer driver 7b transmits the confidential job data J1 to the image forming apparatus 10 through the communication device 77. Thereafter, the printer driver 7b terminates the confidential job transmission processing.

As described above, when the job control unit 8c of the image forming apparatus 10 receives the confidential job data J1 from the host device 7, the job storage processing is executed.

Further, the job control unit 8c executes the confidential print control when an operation requesting the print processing of the confidential job data J1 is performed to the input device 801.

Confidential Print Control

An example of the procedure of the confidential print control will be described below with reference to the flowchart shown in FIG. 5. The confidential print control is an example of processing for realizing a print control method by the CPU 81 of the image forming apparatus 10.

A job control unit 8c starts the confidential print control when an operation requesting execution of the print processing based on the confidential job data J1 is performed to an input device 801.

In the following description, S201, S202 and . . . represent identification codes of a plurality of processes in the confidential job transmission processing. In the confidential print control, first, the process of step S201 is started.

Step S201

In step S201, the job control unit 8c selects one piece of the confidential job data J1 stored in the secondary storage device 83 in accordance with a selection operation to the input device 801. Thereafter, the job control unit 8c shifts the process to step S202.

Specifically, in step S201, the job control unit 8c executes job list output processing for causing the display device 802 to display the list of information of the confidential job data J1 stored in the secondary storage device 83.

For example, the job control unit 8c causes the display device 802 to display a partial or complete list of the transmission source ID (J3) and the document-related data J4 in the confidential job data J1 as a list of the information of the confidential job data J1.

Further, the job control unit 8c selects one piece of confidential job data J1 by selecting one piece of information from the list of information of the confidential job data J1 in accordance with a selection operation to the input device 801.

Step S202

In step S202, the authentication unit 8b executes the user authentication processing. Then, the authentication unit 8b shifts the process to step S203 when the user authentication processing is successful, and shifts the process to step S211 when the user authentication processing is unsuccessful.

Step S203

In step S203, the job control unit 8c shifts the process to step S204 when the selected confidential job data J1 is data directly designated by the user designation data J20, and shifts the process to step S206 when it is data in which the user attribute is designated by the attribute designation data J 21.

Step S204

In step S204, the job control unit 8c specifies one or more pieces of target user data corresponding to a user who is allowed to execute the print processing out of one or more pieces of user designation data J20 included in the submission destination designation data J2 of the confidential job data J1.

When the number of pieces of the user designation data J20 included in the submission destination designation data J2 is one, the job control unit 8c specifies that user designation data J20 as the target user data.

On the other hand, when the submission destination designation data J2 includes a plurality of pieces of user designation data J20 having been prioritized, the job control unit 8c specifies the user designation data J20 that falls within the print permission range according to the prioritization orders as the target user data.

Specifically, the job control unit 8c determines whether or not skip permission conditions set in advance for each of the plurality of pieces of user designation data J20 are satisfied, thereby specifying the user designation data J20 within the print permission range as the target user data.

The skip permission condition is a condition for determining, for each prioritization order, whether or not the execution of the print processing is permitted to the submission destination according to the prioritization order of one level lower that prioritization order. For example, the skip permission condition includes one or both of a time condition and a schedule condition.

The time condition is a condition relating to the elapsed time since the confidential job data J1 is stored in the secondary storage device 83. The time condition is established when a predetermined waiting time has elapsed from a storage date and time which is a date and time when the confidential job data J1 is stored in the secondary storage device 83.

For example, in the job storage processing, the job control unit 8c records the storage date and time data representing the storage date and time in the secondary storage device 83 in association with the confidential job data J1.

The time condition is set for each piece of the remaining data except for one piece of data having the highest prioritization order among the plurality of pieces of prioritized data. Of course, the waiting time in the time condition set to the data of the second highest prioritization order or the lower prioritization orders is shorter than the waiting time in the time condition set to the data of the prioritization order respectively lower than the aforesaid data.

On the other hand, the schedule condition is a condition relating to data representing user absence information corresponding to the user designation data J20 in the previously registered schedule data D2. In this embodiment, the schedule data D2 is registered in the storage device 60 of the data server 6.

The job control unit 8c can acquire the data of the user schedule corresponding to the designated user ID (D11) from the data server 6 by designating the user ID (D11) corresponding to the user designation data J20 and making a request to the data server 6. The data of the user schedule includes data representing the absence information of the user.

The schedule condition is established when the data of the user schedule indicates that the scheduled presence time of the user corresponding to the user designation data J20 from the stored date and time until the waiting time elapses is less than a preset reference time.

In some cases, the scheduled presence time of the user corresponding to the user designation data J20 of high prioritization order may be short. In such a case, by adopting the schedule condition, the user designation data J20 of low prioritization order is specified as the target user data without waiting for the elapse of the waiting time.

After specifying the target user data, the job control unit 8c shifts the processing to a step S207.

Step S205

On the other hand, in step S205, the job control unit 8c specifies one or more pieces of target submission destination data corresponding to a user who is allowed to execute the print processing out of one or more pieces of submission destination designation data J2 in the confidential job data J1.

A plurality of user IDs (D11) in the registration user data D1 include one or more attribute matching user IDs. The attribute matching user ID is a user ID (D11) associated with the organization attribute data D13 designated by one or more pieces of attribute designation data J21 for each piece of submission destination designation data J2.

One or more attribute matching user IDs exist for each submission destination designation data J2. The user ID (D11) is an example of the registration authentication data, the organization attribute data D13 is an example of the user attribute, and the attribute matching user ID is an example of the attribute matching authentication data.

The attribute matching user ID corresponding to the target submission destination data specified in step S205 corresponds to the target user data specified in step S204.

When the number of pieces of the submission destination designation data J2 included in the confidential job data J1 is one, the job control unit 8c specifies the submission destination designation data J2 as the target submission destination data.

On the other hand, when the confidential job data J1 includes a plurality of pieces of submission destination designation data J2 to which the prioritization order is assigned, the job control unit 8c specifies the submission destination designation data J2 that falls within the print permission range according to the prioritization order as the target submission destination data.

Specifically, the job control unit 8c determines whether the skip permission conditions set in advance for each of the plurality of pieces of submission destination designation data J2 are satisfied, thereby specifying the submission destination designation data J2 that falls within the print permission range as the target submission destination data.

The target of determination of the skip permission condition in step S205 is a user corresponding to the attribute matching user ID. The skip permission condition in step S205 includes one or both of the time condition and the schedule condition, just as in step S204.

However, the schedule condition in step S205 is a condition relating to data representing the absence information of the user corresponding to the attribute matching user ID in the previously registered schedule data D2. In step S205, unlike step S204, a plurality of users may be subjected to the determination of the skip permission condition for each piece of the submission destination designation data J2.

For example, in step S205, the job control unit 8c determines that the submission destination designation data J2 is the target submission destination data when the skip permission condition is satisfied for all the users corresponding to the attribute matching user ID for each submission destination designation data J2.

After specifying the target submission destination data, the job control unit 8c shifts the process to step S206.

Step S206

In step S206, the job control unit 8c specifies one or more attribute matching user IDs corresponding to the target submission destination data specified in step S205 as the target user data. Thereafter, the job control unit 8c shifts the process to step S207.

Step S207

In step S207, the job control unit 8c executes consistency determination processing for the user ID (D11) corresponding to the target user data. The user ID (D11) corresponding to the target user data is an example of the registration authentication data or the attribute matching authentication data.

The consistency determination processing is a process for determining whether the input authentication data obtained when the user authentication processing is successful in step S202 is consistent with data corresponding to the target user data among the plurality of user IDs (D11) in the registration user data D1.

When the job control unit 8c determines that the input authentication data matches with any of the user IDs (D11) corresponding to the target user data, the job control unit 8c shifts the process to step S208, and if not, shifts the process to step S211.

Step S208

In step S208, the print control unit 8d causes the printing device 4 to execute the print processing for the print data J10 of the confidential job data J1. Thereafter, the print control unit 8d shifts the process to step S209.

The processes of steps S208 and S209 shown below are executed when the print processing for the confidential job data J1 is executed.

Step S209

In step S209, the job control unit 8c records, in the secondary storage device 83, the result data D3 indicating that the print processing based on the confidential job data J1 has been executed. Thereafter, the job control unit 8c shifts the process to step S210.

For example, the job control unit 8c records result data D3 including data of the date and time when the print processing is executed, the input ID in the input authentication data, the transmission source ID (J3) in the confidential job data J1, and the document-related data J4.

Step S210

In step S210, the job control unit 8c executes a result notification processing. The result notification processing is a process of transmitting the user identification data associated with the user ID (D11) matched with the input authentication data in the registration user data D1 to the transmission source of the confidential job data J1 through the communication device 85.

For example, the user identification data includes a user ID (D11) matching with the input authentication data, and part or all of the corresponding organization attribute data D13 and private attribute data D15.

In addition, the job control unit 8c may erase the confidential job data J1 for which the print processing has been executed from the secondary storage device 83 in step S210.

The job control unit 8c terminates the confidential print control after executing the process of step S210.

Step S211

On the other hand, in step S211, the job control unit 8c executes predetermined error notification processing. Thereafter, the job control unit 8c ends the confidential print control.

As described above, when the submission destination designation data J2 of the confidential job data J1 requested to be executed includes the plurality of pieces of user designation data J20 assigned with the prioritization orders, the job control unit 8c executes the processing of step S204.

Further, the job control unit 8c and the print control unit 8d execute the processing of steps S207 to S208 based on the result of the processing of step S204.

The processing in step S204 is a process for specifying the target user data by determining whether or not the skip permission conditions set in advance for the plurality of pieces of user designation data J20 are satisfied.

The target user data specified in step S204 is user designation data J20 that falls within the print permission range according to the prioritization order.

Then, the job control unit 8c and the print control unit 8d execute the processes of steps S207 to S208 for the target user data.

In steps S207 to S208 following step S204, the job control unit 8c and the print control unit 8d cause the printing device 4 to execute the print processing for the confidential job data J1 on condition that the result of the consistency determination processing is "consistent". This processing is an example of the confidential print control.

Note that when the result of the consistency determination processing is "consistent", this means that the input authentication data when the user authentication processing is successful is consistent with any of the target user data.

By the processing of the steps S204 and S207 to S208, output control based on the prioritization order of the user can be performed for the confidential job data J1 in which a document submission destination including a plurality of users is designated.

On the other hand, when the submission destination designation data J2 of the confidential job data J1 requested to be executed includes the attribute designation data J21 for designating one or more user attributes, the job control unit 8c executes the processes of steps S205 to S206.

Further, the job control unit 8c and the print control unit 8d execute the processes of steps S207 to S208 based on the results of the processes of steps S205 to S206.

The processes in steps S205 to S206 specify one or more of the attribute matching user IDs among the plurality of user IDs (D11) in the registration user data D1 as the target user data. The attribute matching user ID is a user ID (D11) associated with the organization attribute data D13 designated by the attribute designation data J21.

The plurality of user IDs (D11) in the registration user data D1 is an example of the registration authentication data, the organization attribute data D13 is an example of the user attribute, and the attribute matching user ID is an example of the attribute matching authentication data.

Then, the job control unit 8c and the print control unit 8d execute the processes of steps S207 to S208 for the target user data.

In steps S207 to S208 following steps S205 to S206, the job control unit 8c and the print control unit 8d cause the printing device 4 to execute the print processing for the confidential job data J1 on condition that the result of the consistency determination processing is "consistent". This processing is also an example of the confidential print control.

In step S205, the job control unit 8c specifies the target submission destination data when the confidential job data J1 requested to be executed includes a plurality of pieces of submission destination designation data J2 assigned with the prioritization order.

As described above, the target submission destination data is the submission destination designation data J2 that falls within the print permission range according to the prioritization order. The job control unit 8c determines whether or not the skip permission conditions set in advance for each of the plurality of pieces of submission destination designation data J2 are satisfied, thereby specifying the target submission destination data.

Further, in steps S206 to S208, the job control unit 8c and the print control unit 8d execute the confidential print control for the target user data corresponding to the target submission destination data. The target user data corresponding to the target submission destination data is an example of the attribute matching authentication data.

Through the processes of steps S 205 to S 208, the output control of the confidential job data J1 can be made not by direct designation of the user but by designation of a document submission destination such as a department to which a plurality of users belong.

For example, when the confidential job data is data of a document requiring approval, such as data of an application form, a user who is a recipient of the document is designated as a user who is permitted to perform the print processing in the confidential job data.

However, if the user designated in the confidential job data is unable to quickly print and confirm the document, the necessary procedures may be delayed.

Depending on the type of document corresponding to the confidential job data, a document submission destination including a plurality of users may be desirable to be designated in the confidential job data. However, in this case, it is important to control the prioritization order of the users to process the document of the confidential job data in order to avoid confusion in document processing.

According to the present disclosure, it is possible to provide a print control method and an image forming apparatus capable of performing output control based on a user's prioritization order for confidential job data in which a document submission destination including a plurality of users is designated.

First Application Example

Next, the confidential print control according to the first application example applicable to the image forming apparatus 10 will be described.

Figure 8:
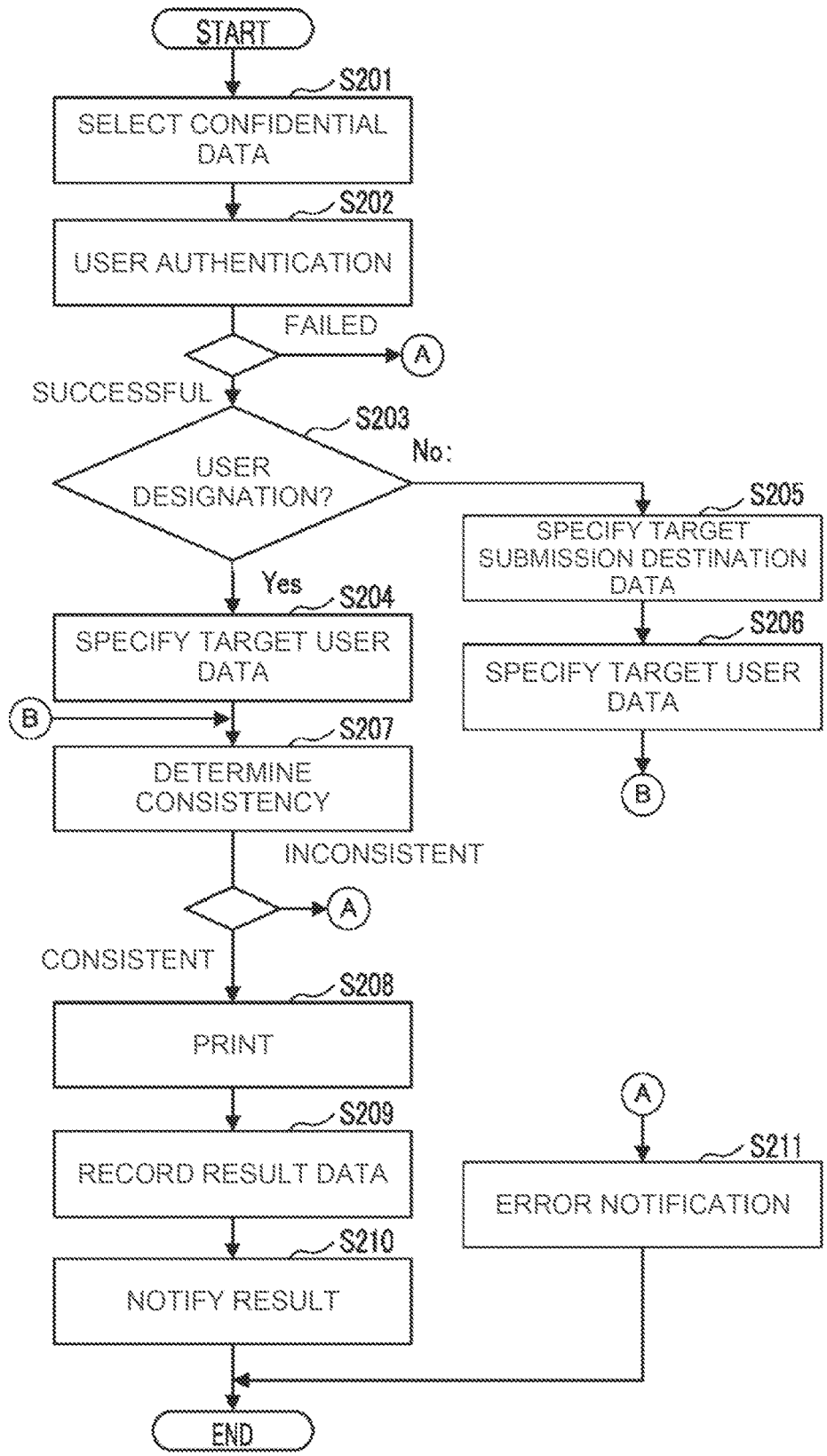
FIG. 8 is a flowchart showing an example of the procedure of the confidential print control by the image forming apparatus according to the embodiment.

When the job list output processing is executed in step S201 of FIG. 8, the job control unit 8c in this application example restricts the display of information according to the contents of the confidential job data J1.

Specifically, in the job list output processing, the job control unit 8c does not display information on the display device 802 with respect to the confidential job data J1 satisfying the predetermined concealment condition, or displays information more restricted than for other confidential job data J1 on the display device 802.

The restriction of the display information is realized such that part or all of the content information such as the information of the document-related data J4 is not displayed while displaying the information indicating the existence of the confidential job data J1. For example, the concealment condition includes one or both of a keyword condition and an authority level condition.

The keyword condition is a condition that a previously set concealment keyword is included in the document information included in the confidential job data J1. For example, the document information is information of the document-related data J4 or information included in the print data J10.

On the other hand, the authority level condition includes a first authority level condition that the user designation data J20 corresponding to the authority level D132 equal to or higher than a preset level is included in the submission destination designation data J2.

Further, the authority level condition includes a second authority level condition that the submission destination designation data J2 is data for designating an authority level D132 equal to or higher than a preset level as the user attribute.

The confidential job data J1 having a user corresponding to a high authority level D132 as a submission destination is often more confidential than other confidential job data J1. The setting of the authority level condition causes the display of information on the confidential job data J1 having higher level of confidentiality to be restricted.

Second Application Example

Next, the confidential job transmission processing according to the second application example applicable to the host device 7 of the image forming system 1 will be described.

Figure 5:
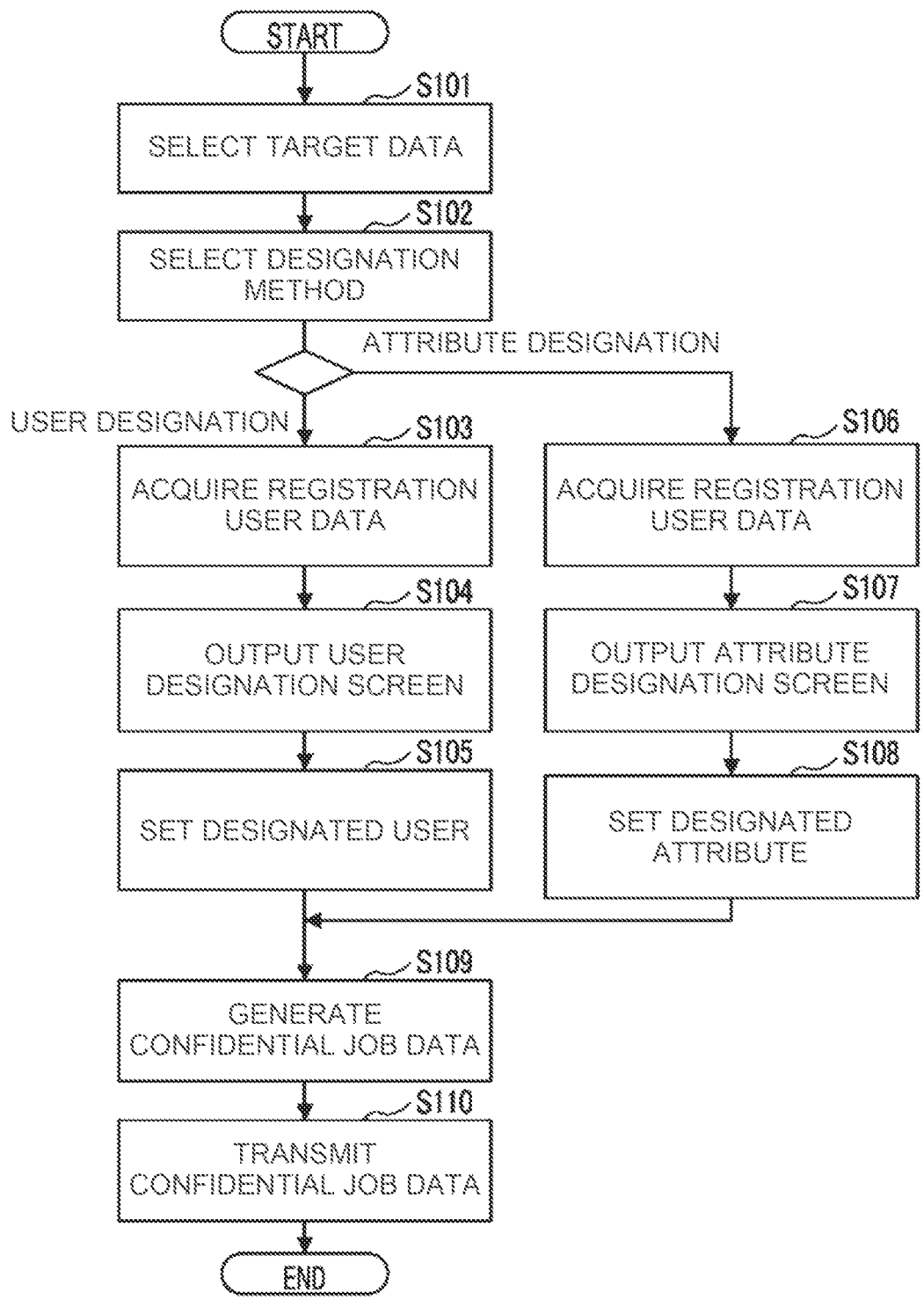
FIG. 5 is a flowchart showing an example of the procedure of the confidential job transmission processing by the host device.

In step S105 of FIG. 5, the printer driver 7b of the host device 7 in the present application example executes the first designation restriction processing when a plurality of pieces of user designation data J20 assigned with the prioritization orders are set.

As described above, the plurality of user IDs (D11) in the registration user data D1 are data of a plurality of registered users associated with an authority level D132 representing a level of authority of each user.

The printer driver 7b executes the first designation restriction processing when each of the plurality of pieces of prioritized user designation data J20 is selected from a plurality of user IDs (D11) in the registration user data D1.

In the first designation restriction processing, each of the plurality of settable user designation data J20 is restricted to a user ID (D11) associated with an authority level D132 equal to or higher than the authority level D132 associated with the other user designation data J20 of higher prioritization order among the plurality of user IDs (D11).

Further, the printer driver 7b of the host device 7 in this application example executes the second designation restriction processing in step S105 of FIG. 5.

The printer driver 7b executes the second designation restriction processing when the user attribute set for each of the plurality of prioritized submission destination designation data J2 includes an authority level D132 representing the authority level of each user.

In the second designation restriction processing, the authority level D132 that can be set for each of the plurality of submission destination designation data J2 is restricted to the authority level D132 that is the same as or higher than the authority level D132 set for the other submission destination designation data J2 of higher prioritization order.

This application example is utilized in an operating environment in which, for example, when the position of the submission destination having the higher prioritization order is a section chief, the position of the submission destination having the lower prioritization order is required to be a section chief or higher.

What is claimed is:

1. A print control method wherein an image forming apparatus stores, when the image forming apparatus receives confidential job data including print data and submission destination designation data for designating submission destination, the confidential job data in a storage device, and the image forming apparatus thereafter executes print processing based on the print data of the confidential job data when user authentication corresponding to the submission destination designation data is successful, comprising:

an authentication processing step; and
a confidential print control step, wherein
the authentication processing step executes user authentication processing of collating input authentication data, having been input, with a plurality of pieces of registration authentication data in registration user data registered in advance,
the confidential print control step executes confidential print control of determining whether skip permission conditions set in advance for each of the plurality of pieces of user designation data are satisfied when the submission destination designation data of the confidential job data requested to be executed includes a plurality of pieces of user designation data assigned with prioritization orders, thereby specifying the user designation data falling within a print permission range according to the prioritization orders, and executing confidential print control for the user designation data within the print permission range, and
the confidential print control step includes a step of causing the image forming apparatus to execute the print processing for the confidential job data on the condition that the input authentication data by which the user authentication processing is successful matches data corresponding to the user designation data among the plurality of pieces of registration authentication data.

2. The print control method according to claim 1, wherein the confidential print control step further includes a step of transmitting user identification data associated with the registration authentication data matched with the input authentication data in the registration user data to the transmission source of the confidential job data through a communication device when the print processing for the confidential job data is executed.

3. The print control method according to claim 1, wherein the skip permission condition includes one or both of a time condition relating to an elapsed time since the confidential job data is stored in the storage device and a schedule condition relating to data representing user absence information corresponding to the user designation data in pre-registered schedule data.

4. The print control method according to claim 1, wherein the confidential print control step further includes a step of executing job list output processing for causing a display device to display a list of information of the confidential job data stored in the storage device; and
in the job list output processing, information display is not performed on the display device for the confidential job data satisfying a predetermined concealment condition, or information more restricted than for other confidential job data is displayed on the display device.

5. The print control method according to claim 4, wherein the concealment condition includes one or both of a keyword condition in which a preset concealment keyword is included in document information included in the confidential job data and an authority level condition in which the user designation data corresponding to the authority level equal to or higher than a preset level is included in the submission destination designation data when the registration user data includes data of an authority level representing a level of each user's authority.

6. An image forming apparatus comprising:
a communication device,
a printing device,
a storage device,
a user authentication processing device, and
a confidential print control unit, wherein
the communication device is capable of receiving job data including print data,
the printing device is capable of executing print processing based on the print data,
the storage device is capable of storing the print data,
the user authentication processing device is capable of executing user authentication processing,
when the communication device receives confidential job data including the print data and submission destination designation data for designating a submission destination, the confidential print control unit stores the confidential job data in the storage device, and thereafter, when user authentication corresponding to the submission destination designation data is successful, makes the printing device execute print processing based on the print data of the confidential job data,
the user authentication processing device executes user authentication processing for collating input authentication data, having been input, with a plurality of pieces of registration authentication data in registration user data registered in advance,
when the submission destination designation data of the confidential job data requested to be executed includes a plurality of pieces of user designation data assigned with prioritization orders, the confidential print control unit determines whether skip permission conditions set in advance for each of the plurality of pieces of user designation data are satisfied, thereby specifying the user designation data falling within a print permission range according to the prioritization orders, and makes the printing device execute confidential print control for the user designation data within the print permission range, and
the confidential print control unit causes the printing device to execute the print processing for the confidential job data on condition that the input authentication data by which the user authentication processing is successful matches data corresponding to the user designation data among the plurality of pieces of registration authentication data.

* * * * *